Aug. 22, 1950  M. W. MARIEN  2,519,684

PISTON RING

Filed March 7, 1949

INVENTOR
MELVIN W. MARIEN
BY Harry A. Burns
ATTORNEY.

Patented Aug. 22, 1950

2,519,684

UNITED STATES PATENT OFFICE 2,519,684

PISTON RING

Melvin W. Marien, St. Louis, Mo., assignor to Ramsey Corporation, St. Louis, Mo., a corporation of Delaware Application March 7, 1949, Serial No. 79,941

3 Claims. (Cl. 309—44)

My invention has relation to improvements in piston packing rings for internal combustion engines, and it consists in the novel features of construction more fully set forth in the specification and pointed out in the claims.

The invention is directed more specifically to the type of piston ring designed especially for the control of lubrication within the cylinder and is generally known in the automotive art as an oil control rig. Its essential purpose is to prevent excess oil flow over the cylinder and into the combustion space thereof. This is generally accomplished by combining a plurality of ring elements in a single ring groove in such spaced relation as to provide oil passageways between narrow cylinder contacting surfaces which scrape the excess oil from the wall and vent it through the ring to the crank case.

Obviously, a piston ring which comprises an assembly of a plurality of independent elements is difficult to install and often broken in the process. Furthermore, there is considerable internal friction during the operation of a compound ring as the respective ring elements act independently. This, of course, calls for increased ring tension and increased drag on the cylinder without sufficient compensation in efficiency.

Figure 1:
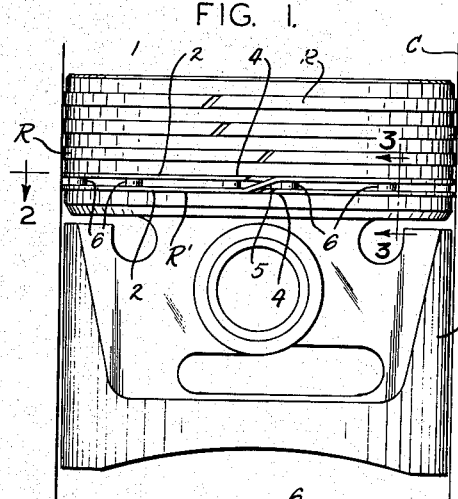
Figure 3:
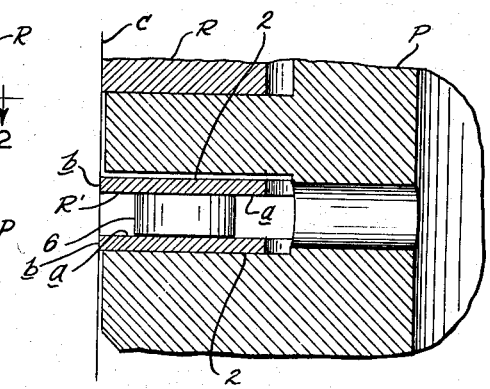
Figure 2:
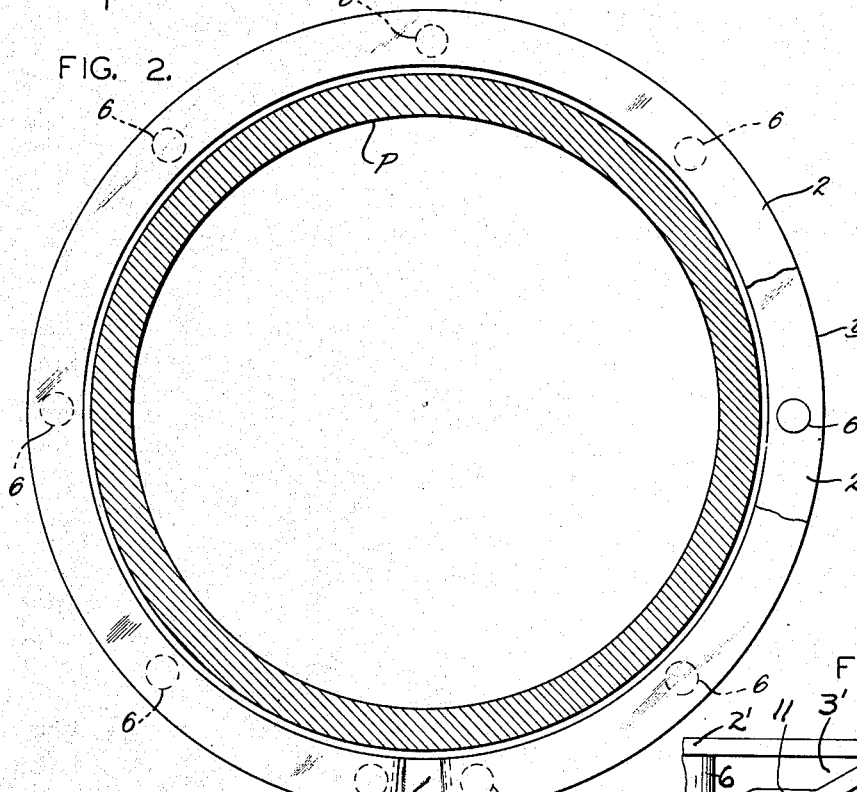
Figure 5:
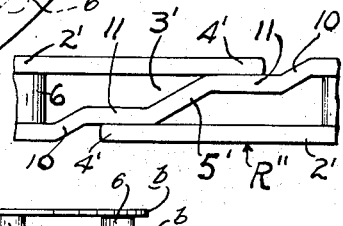
Figure 4:
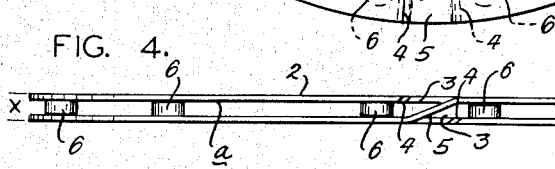

It is the object of the present invention to provide an oil control ring in which all the advantages of a multiple element ring are obtained without the disadvantages mentioned. I obtain these advantages by utilizing a helical steel coil of two turns held in spaced relation by bosses welded on the opposing surfaces of the coils so as to form a unitary structure in which internal friction is reduced to a minimum. These objects together with other advantages inherent in the invention will be better apparent from a detailed description of the invention in connection with the accompanying drawings, in which:

Figure 1 is a side elevation of an engine piston showing my improved ring mounted in the lower ring groove; Figure 2 is an enlarged horizontal cross section taken on the line 2—2 of Figure 1; Figure 3 is an enlarged cross sectional detail taken on the line 3—3 of Figure 1; Figure 4 is a side elevation or face view of my improved ring; and Figure 5 is a fragmentary side elevation of a modified form of ring having a stepped offset portion.

Referring to the drawings, P represents a piston operable in cylinder C and having the usual compression rings R, R and oil control ring R' in groove I. This invention as stated is directed solely to the oil control ring R'. However, there may be several rings R' on a piston depending on the requirements of the engine designer.

The oil control ring R' as clearly shown in the drawings is formed of a helical coil bent edgewise from a ribbon of steel, the coil having two turns 2, 2 and a gap 3 between the ring ends 4, 4 when the turns are separated as shown (Figure 4). At an intermediate point between the ring ends 4, 4 an inclined portion 5 is formed to permit the turns 2, 2 to lie in spaced parallel planes. In other words, instead of the pitch of the helix being distributed around the helix it is all accumulated in the portion 5 thereof.

In order to maintain the turns 2, 2 in spaced relation, as shown, there are a plurality of spacing bosses 6, 6, etc. welded on the inner surfaces $a$, $a$ of the coil turns 2, 2 in alternation and uniformly spaced. If desired the bosses 6 may be welded entirely around the circumference of only one of the turns. The height of the bosses is such as to fix the over-all width X of the ring R' at the proper dimension for any given ring groove I, so as to fit the groove with the clearance specified by the industry.

When my improved ring R' is disposed in a piston ring groove, the coil turns 2, 2 bear against the wall of cylinder C with high unit pressure because of the tension built into the coil. However, because of the narrow cylinder contacting faces $b$, $b$ the total wall pressure of the ring R' will be comparatively low. The ring thus operates with high efficiency to remove excess oil from the cylinder without excessive cylinder drag.

The bosses 6 occupy so little of the space between coil turns 2, 2 that the oil will pass through this space as rapidly as it is removed from the cylinder wall. Therefore, there is little chance for hydraulic pressure to be built up with groove I to interfere with the efficient operation of the ring.

In Figure 5 I show a modified form of ring R'' in which the offset 5' which passes through gap 3' of the coil has terminal offsets 10, 10 in the turns 2', 2' on each side of offset 5', so as to provide steps 11, 11 to furnish supports for the ring ends 4', 4'. This support of the ring ends 4', 4' prevents ring flutter during the operation of the ring.

Having described my invention, I claim:

1. A piston ring for internal combustion engines comprising a helical coil of two axially spaced turns bent edgewise from a ribbon of metal, the ends of the coil being spaced to provide a gap and the intermediate portion of the ring between the turns having an offset passing through the gap, and spacing lugs fixed to the coil turns to determine the axial width of the ring, and maintain the coils in parallelism.

2. A piston ring for internal combustion engines comprising a helical coil of two axially spaced turns bent edgewise from a ribbon of metal, the ends of the coil being spaced to provide a gap and the intermediate portion of the ring between the turns having an offset passing through the gap, and spacing lugs fixed to one of said coil turns to determine the axial width of the ring.

3. A piston ring for internal combustion engines comprising a helical coil of two axially spaced turns bent edgewise from a ribbon of metal, the ends of the coil being spaced to provide a gap and the intermediate portion of the ring between the turns having an offset passing through the gap, and spacing lugs welded to the coil turns alternately around their circumferences to determine the axial width of the ring.

MELVIN W. MARIEN.

REFERENCES CITED

The following references are of record in the file of this patent:

UNITED STATES PATENTS

| Number | Name | Date |
|---|---|---|
| 2,128,372 | Marien | Aug. 30, 1938 |
| 2,245,386 | Carlton | June 10, 1941 |
| 2,303,665 | Smith | Dec. 1, 1942 |
| 2,309,442 | Craig | Jan. 26, 1943 |